Patented Aug. 24, 1937

2,090,642

UNITED STATES PATENT OFFICE 2,090,642

METHOD OF MAKING NONREACTIVE LITHOPONE

John P. Ruth and Howard M. Boyd, Collinsville, Ill., assignors to The Glidden Company, Cleveland, Ohio, a corporation of Ohio No Drawing. Application October 15, 1935, Serial No. 45,118

8 Claims. (Cl. 134—78)

This invention relates to lithopone, and has particular reference to a method for making lithopone non-reactive with acid paint vehicles, the method comprising the treatment of the calcined pigment with gaseous carbon dioxide, whereby the zinc oxide present is converted to non-reactive compounds, followed preferably by an adjustment of the pH to a slight alkalinity.

Lithopone is a white pigment consisting usually of approximately equi-molecular quantities of barium sulphate and zinc sulphide. It is customarily made by the mutual precipitation of these two compounds from solutions of barium sulphide and zinc sulphate. The precipitate, which is known as raw or crude lithopone, is filtered, dried, calcined at red heat, quenched in water, ground, washed, dried and disintegrated. The final or finished lithopone usually contains varying amounts of zinc oxide up to 3%. When lithopone containing a quantity of zinc oxide is ground in acid oil or other acidic vehicles the zinc oxide causes livering or thickening. The removal of the zinc oxide, to permit of use with these vehicles, is therefore highly desirable.

Various methods have been proposed heretofore, for the removal of this zinc oxide content. The method in common use is based on the fact that zinc oxide is soluble in dilute acids, while zinc sulphide is not. In conventional practice, the calcined pigment is wet ground, the pH is reduced to 5.0 or less with some acid and the solubles are washed out until the pH of the pigment cake indicates neutrality or slight alkalinity. This method requires considerable expense in washing, and reduction of zinc content in the lithopone due to loss of the zinc oxide content.

More recently it has been proposed to use phosphoric acid to reduce the alkalinity, allowing the zinc phosphate to remain with the pigment. This method is, of course, rather expensive because of the high cost of the phosphoric acid.

It has also been proposed to suspend lithopone in ammonia, and pass in carbon dioxide gas, to form zinc carbonate, which goes into solution into the ammonia; this is filtered from the pigment, and the ammonia removed from the filtrate to recover the zinc carbonate. This method has little advantage over the acid treatment, except that it yields slightly better light-fastness; and the cost is high, entailing the use of ammonia, and the operation of a recovery plant for the zinc carbonate and for the ammonia gas.

We have discovered that all of these elaborate methods are unnecessary, and that a light-fast, non-reactive lithopone with all of its zinc content may be obtained by a simple treatment of a slurry of calcined lithopone with carbon dioxide, carrying the reaction to the point where the slurry is neutral or slightly acid. By using carbon dioxide, the zinc oxide content of the lithopone is converted to a non-reactive compound, whose exact constitution is immaterial, but is probably $ZnCO_3$; the zinc content of the lithopone is maintained at its former level, so that no loss of hiding power results; and there is no loss of light-fastness, as is the case with the simple acid treatment in use heretofore.

We prefer to introduce our carbon dioxide by passing the gas into the solution or by adding solid carbon dioxide, as this introduces no water soluble salts into the lithopone, which must later be washed out. However, the advantages of maintenance of zinc content, non-reactivity and no loss of light-fastness can be obtained by liberating carbon dioxide in the pigment slurry by means of a reaction between a reagent such as sodium bicarbonate with an acid; the acid acts to liberate the carbon dioxide from the bicarbonate before attacking the zinc oxide. The results are identical with those obtained by the use of gaseous carbon dioxide, except a soluble salt is present which must be washed out in the filtration of the slurry.

In order to completely neutralize the zinc oxide content of the lithopone, and to make the pigment reasonably non-reactive, it is necessary to carry the slurry at least to neutrality, and preferably to a slight acidity; we prefer to carry the slurry to a pH of about 6.9 in order to insure complete reaction without undue waste of carbon dioxide. Higher acidity we find unnecessary, although not objectionable except from an economical viewpoint.

While the pigment treated with $CO_2$ alone is reasonably non-reactive, we have found that an improvement in this regard can be obtained by an upward adjustment of the pH, preferably to the range of 7.5 to 8.0, the tendency to react with acid vehicles being thereby substantially eliminated. This adjustment also helps in the filtration, and gives a product which is more easily wet by paint vehicles than the unadjusted pigment.

As an example of our invention, we precipitated approximately five pounds of conventional lithopone by reacting a 25% zinc sulphate solution with an 18% barium sulphide solution. The pH of the pulp was adjusted to 7.8, and the precipitate filtered, dried, and calcined in an inert atmosphere for one hour at 850° C. It was then pulped with water and wet ground—a portion was filtered and dried. The pigment contained 28.5% ZnS, 70.5% BaSO₄ and .65% ZnO, the total zinc equalling 19.62%. On grinding with an acid refined linseed oil (acid number 6.0) the typical bodying occurred.

A portion of the wet ground slurry containing approximately one pound of this pigment was treated with sulphuric acid to 5.0 pH and washed repeatedly with water until practically all water soluble salts were removed. A portion was filtered and dried. The pigment contained 19.25% total zinc compared with 19.62% on the raw pigment.

Another portion of this slurry was then treated by our method; slurry containing two pounds of pigment was used, and carbon dioxide was passed into this slurry, maintained at room temperature, until the pH had dropped to 6.9. This required six hours and the use of ½ pound of carbon dioxide. This is in excess of the theoretical quantity and was necessary principally because of the inefficient absorption power. The slurry was then adjusted to pH 8.0 by the addition of one gram of sodium carbonate; the pigment was filtered and dried. It contained 19.58% total zinc, as compared with the 19.62% of the raw pigment, indicating that practically no zinc had been lost; it did not body with acid refined linseed oil, or other oils and its light-fastness was equal to that of the alkaline untreated pigment.

The last run was then repeated, obtaining the carbon dioxide by adding 30 grams of sodium bicarbonate and 18 grams of sulphuric acid to the slurry and adjusting to 6.9 pH. On filtering the pigment, it was washed to remove the sodium sulphate; reslurried and 0.5 gram sodium carbonate added to adjust to 8.0 pH and the resultant pigment was practically identical with that obtained using gaseous carbon dioxide.

Similar runs on other batches of lithopone, including materials of high zinc sulphide content, showed similar reduction of bodying without loss of zinc content, or decrease in light-fastness. Variations in the pH with the carbon dioxide treatment, from 6.5 to 8.2 were made, it being found that results were improved down to 6.9 pH, but not below. With the CO₂ treatment alone the bodying action is largely eliminated but it is still further improved by following with sodium carbonate treatment to 8.0 pH.

It has been found that other alkaline reagents can be used in place of the sodium carbonate, such as barium hydroxide; sodium hydroxide; ammonium carbonate; calcium carbonate, etc.; however we prefer sodium carbonate in our process, although we are not restricted to its use.

As we have indicated above, conditions can be varied widely without departing from the scope of our invention, which comprises the precipitation, in the lithopone of the free zinc oxide content with carbon dioxide, to form insoluble nonbasic compounds.

We claim:

1. The process of making non-reactive lithopone comprising treating an aqueous slurry of calcined lithopone containing zinc oxide with carbon dioxide to convert the zinc oxide to insoluble compounds not reactive with acid-refined linseed oil in such fashion that the zinc oxide-carbon dioxide reaction product remains in the pigment.

2. The process of making a lithopone non-reactive with acid paint vehicles, comprising treating an aqueous slurry of calcined lithopone containing zinc oxide with carbon dioxide until the pH value of the slurry has been reduced to not more than 7.0, thereby converting the zinc oxide to insoluble compounds not reactive with acid refined linseed oil.

3. The process of claim 2, in which the pH is carried to 6.9.

4. The process of making a lithopone non-reactive with acid paint vehicles comprising treating an aqueous slurry of calcined lithopone containing zinc oxide with carbon dioxide until the pH value of the slurry has been reduced to not more than 7.0, thereby converting the zinc oxide to insoluble compounds non-reactive with acid refined linseed oil, adjusting the pH of the slurry to a slight alkalinity, and thereafter filtering and drying the pigment.

5. The method of claim 4 in which the carbon dioxide treatment is continued until the slurry has a pH of 6.9.

6. The process of making a lithopone non-reactive with acid paint vehicles, comprising treating an aqueous slurry of calcined lithopone containing zinc oxide with carbon dioxide until the pH value of the slurry has been reduced to not more than 7.0, and then adjusting the pH of the slurry to 7.5 to 8.0.

7. The process of making a lithopone non-reactive with acid paint vehicles, comprising treating an aqueous slurry of calcined lithopone containing zinc oxide with carbon dioxide until the pH of the slurry is 6.9, and then adjusting the pH of the slurry to 7.5 to 8.0.

8. A light-resistant lithopone not reactive with acid refined linseed oil, comprising a calcined lithopone whose zinc oxide content has been rendered thus non-reactive by reaction with carbon dioxide, the reaction product being contained in the final pigment.

JOHN P. RUTH.
HOWARD M. BOYD.